United States Patent
Sitaram et al.

(10) Patent No.: US 9,301,218 B1
(45) Date of Patent: Mar. 29, 2016

(54) OVERCOMING HANDOVER FAILURE DUE TO OUT-OF-DATE NEIGHBOR LIST

(71) Applicant: SPRINT COMMUNICATIONS COMPANY, L.P., Overland Park, KS (US)

(72) Inventors: Krishna Sitaram, Chantilly, VA (US); Daniel Alberto Vivanco, Sterling, VA (US); Chunmei Lu, Great Falls, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 160 days.

(21) Appl. No.: 14/152,533

(22) Filed: Jan. 10, 2014

(51) Int. Cl.
*H04W 36/00* (2009.01)
(52) U.S. Cl.
CPC ...... *H04W 36/0061* (2013.01); *H04W 36/0083* (2013.01)
(58) Field of Classification Search
CPC ...................... H04W 36/0061; H04W 36/0083
USPC ......................................................... 455/436
See application file for complete search history.

(56) References Cited

U.S. PATENT DOCUMENTS

| | | | |
|---|---|---|---|
| 8,588,089 B2 | 11/2013 | Dottling | |
| 8,861,494 B2 | 10/2014 | Mukhopadhyay | |
| 2005/0130655 A1 | 6/2005 | Lundh et al. | |
| 2008/0227455 A1 | 9/2008 | Kim | |
| 2011/0143743 A1 | 6/2011 | Pollakowski et al. | |
| 2011/0268044 A1 | 11/2011 | Yun et al. | |
| 2012/0026918 A1 | 2/2012 | Won et al. | |
| 2012/0099442 A1* | 4/2012 | Bakker | H04W 76/021 370/242 |
| 2012/0275315 A1* | 11/2012 | Schlangen | H04W 24/02 370/242 |
| 2014/0073304 A1 | 3/2014 | Brisebois et al. | |
| 2015/0043386 A1* | 2/2015 | Racz | H04L 41/044 370/255 |

OTHER PUBLICATIONS

First Action Interview Preinterview Communication dated Jun. 30, 2015 in U.S. Appl. No. 14/152,504, 5 pages.
First Action Interview Preinterview Communication dated Oct. 6, 2015 in U.S. Appl. No. 14/152,543, 5 pages.
Notice of Allowance dated Nov. 16, 2015 in U.S. Appl. No. 14/152,543, 10 pages.
Notice of Allowance dated Dec. 21, 2015 in U.S. Appl. No. 14/152,504, 17 pages.

* cited by examiner

*Primary Examiner* — Barry Taylor (57) ABSTRACT

A base station's neighbor list may become outdated as nearer base stations are deployed. Because mobile devices report non-unique identifiers of surrounding base stations, a serving base station may confuse a newer neighboring base station with an out-of-date neighboring base station having the same non-unique identifier. The base station may attempt to hand over the mobile device to the wrong base station based on its outdated neighbor list. The mobile device may notify the serving base station of the failure and the associated non-unique identifier. When again attempting to hand over a mobile device to the target base station having that non-unique identifier, the serving base station may, based on knowing the previous handover failed, request the mobile device to provide the unique identifier of the target base station. If the unique identifier does not match the information in the neighbor list, the base station can update the neighbor list.

20 Claims, 5 Drawing Sheets

OVERCOMING HANDOVER FAILURE DUE TO OUT-OF-DATE NEIGHBOR LIST

CROSS-REFERENCE TO RELATED APPLICATIONS

This application is related by subject matter to the following concurrently filed U.S. patent applications: U.S. application Ser. No. 14/152,504, entitled "Updating an Out-Of-Date Source Neighbor List,"; and U.S. application Ser. No. 14/152,543, entitled "A Self-Healing Algorithm to Overcome Handover Failure Due to Out-Of-Date Neighbor List,", both of which are incorporated by reference herein.

SUMMARY

A high-level overview of various aspects of the invention are provided here for that reason, to provide an overview of the disclosure and to introduce a selection of concepts that are further described below in the detailed description section. This summary is not intended to identify key features or essential features of the claimed subject matter, nor is it intended to be used as an aid in isolation to determine the scope of the claimed subject matter. In brief and at a high level, a base station maintains a neighbor list of base stations that is utilized during hand over of a device, such as a mobile device. During initial deployment of base stations in a market, a base station's neighbor list may become outdated as additional, nearer base stations are deployed. Because a mobile device reports the identities of surrounding base stations based on non-unique identifiers associated with the base stations, a base station may confuse a newly deployed neighboring base station with an out-of-date neighboring base having the same non-unique identifier as the newly deployed base station. In that event, the base station will erroneously attempt to hand over the mobile device to the wrong base station because the base station's neighbor list is out of date. The mobile device may detect that a handover attempt has failed, and notify the serving base station of the non-unique identifier associated with the target base station. The next time the serving base station determines to hand over a mobile device to the target base station having that non-unique identifier, the serving base station may request the mobile device to provide the unique identifier of the target base station. If the unique identifier does not match the information in the neighbor list, the base station can then update the neighbor list with the correct information.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

The subject matter of select embodiments of the present invention is described with specificity herein to meet statutory requirements. But the description itself is not intended to define what we regard as our invention, which is what the claims do. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

ANR Automatic Neighbor Relations
CDMA Code Division Multiple Access
ECGI E-UTRAN Cell Global Identifier
ECI E-UTRAN Cell Identifier
eNB Enhanced Node B
eNode B Enhanced Node B
E-UTRAN Evolved UMTS Terrestrial Radio Access Network
GIS Geographic Information System
GPRS General Packet Radio Service
GSM Global System for Mobile Communications
LTE Long Term Evolution
MCC Mobile Country Code
MNC Mobile Network Code
PCI Physical Cell Identifier
PLMN Public Land Mobile Network
RACH Random Access Channel
RRC Radio Resource Control
TDMA Time Division Multiple Access
UMTS Universal Mobile Telecommunications System
X2AP X2 Application Protocol Some embodiments of the present invention may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. By way of example, and not limitation, computer-readable media include media implemented in any method or technology for storing information readable by a computing device. Examples of stored information include program modules including instructions, data structures, other data representations, and the like. Media examples include, but are not limited to information-delivery media, devices such as RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Some embodiments of the present invention are described herein in terms of an LTE network. However, embodiments are not limited to an LTE network, but rather may include any type of network that provides similar functionality to LTE. A handover of a mobile terminal requires a serving cell to know about the existence of neighboring cells. This information may be stored as a neighbor list, or neighbor relation table.

The management of neighbor cell relations can be a time consuming task both for new technology deployments such as LTE, and for provisioning of 2G and 3G cells. Automatic Neighbor Relations (ANR), which is a part of the Long Term Evolution (LTE) standard, is intended to reduce the amount of intervention necessary by a service provider within its network during the process of managing neighbor cell relations.

An exemplary network includes base stations that communicate with user devices such as mobile phones, laptop computers, tablet devices, and so forth. In the case of LTE, a base station is referred to as an enhanced Node B, often abbreviated as eNode B or eNB. An eNB is associated with a plurality of identifiers. A Physical Cell Identifier (PCI) identifies the cell that is served by the eNB. There are currently a total of 504 PCIs defined for use within LTE networks. That limited number can result in PCI reuse within a market, such as when an LTE network is rolled out in a dense metropolitan area. Thus, the PCI is a non-unique identifier, because it may be reused within a market and does not uniquely identify an eNB.

An eNB is also associated with an E-UTRAN cell identifier (ECI) that unambiguously identifies a cell within a public land mobile network (PLMN). The PLMN is identified by a mobile country code (MCC) and mobile network code (MNC). The PLMN identifier and ECI together form the E-UTRAN cell global identifier (ECGI), which is a system-level parameter that is unique. Thus, each eNB possesses both a non-unique identifier and a unique identifier.

An eNB maintains its neighbor list that is utilized during hand over of an LTE terminal, such as a mobile device. The neighbor list includes neighboring base stations to which an LTE terminal may be handed over. Traditionally, a base station's neighbor list was created manually as a network was deployed. However, using ANR, the neighbor list is learned by the eNB on the fly. In general terms, a serving eNB, utilizing the Radio Resource Control (RRC) protocol, sends RRC Measurement Control messages to instruct LTE terminals with which it is communicating to take quality measurements of neighboring cells on a periodic basis. In response, each LTE terminal returns an RRC Measurement Report that identifies the PCIs of other eNBs the LTE terminal is receiving and respective signal strengths associated with the eNBs. When an LTE terminal reports a PCI that is not listed in the serving eNB's neighbor list, the serving eNB instructs the terminal to report the ECGI of the eNB identified by the PCI. Once the ECGI is received, the serving eNB updates its neighbor list to include the PCI and ECGI for the newly discovered eNB.

In the initial stage of deploying a network in a given market, base stations are few, and are deployed in a "popcorn" fashion, i.e., one here, one there, in a widely spread, scattered fashion. This stage of network deployment is referred to herein as the popcorn stage. During the popcorn stage, an eNB may populate its neighbor list with base stations that are relatively far away, in comparison to the proximity of neighbors in a fully-deployed network. As more base stations are gradually deployed, it is likely that the eNB's neighbor list will grow to include base stations that are nearer than those initially discovered.

When a base station is deployed near the eNB, and happens to share the same PCI as a more distant base station in the eNB's neighbor list, a situation referred to herein as "PCI confusion" may occur. An LTE terminal may report the PCI of the nearby base station to the eNB, and the eNB may determine to hand over the LTE terminal to that base station, based on the measurement report, but the eNB's neighbor list is outdated, because it includes the PCI and ECGI of the base station that is farther away. Thus, the eNB will attempt to hand over the LTE terminal to the base station in the neighbor list, rather than the nearby base station that has the same PCI as the more distant base station. The result is that the handover will fail.

In a first aspect, computer-readable media are provided for facilitating a method for updating a neighbor list. A notification is received that a handover of a first mobile device to a first target base station failed, where the notification includes a non-unique identifier associated with the first target base station. An entry in the neighbor list is identified that is associated with the non-unique identifier. The entry is flagged in response to the notification that the handover failed. A second target base station is identified for handing over a second mobile device, where the second target base station is associated with the same non-unique identifier as the first target base station. A determination is made that the entry in the neighbor list associated with the non-unique identifier is flagged. Based on the determination that the entry in the neighbor list is flagged, the second mobile device is requested to send a unique identifier that is associated with the second target base station. The unique identifier associated with the second target base station is received, and when the received unique identifier does not correspond to a unique identifier in the flagged entry associated with the non-unique identifier, then the neighbor list is updated with the received unique identifier.

In a second aspect, a system is provided for updating a neighbor list. The system includes a first mobile device and a source base station in a mobile communications network that communicates with the first mobile device. The source base station is configured to: send a message to the first mobile device identifying a first target base station for a handover of the first mobile device from the source base station to the first target base station; receive a notification that the handover failed, where the notification includes a non-unique identifier associated with the first target base station; identify an entry in the neighbor list that is associated with the non-unique identifier; and flag the entry in response to the notification that the handover failed. The source base station is further configured to: identify a second target base station for handing over a second mobile device, where the second target base station is associated with the same non-unique identifier as the first target base station; and determine that the entry in the neighbor list associated with the non-unique identifier is flagged. The source base station is additionally configured to, based on the determination that the entry is flagged, request the second mobile device to send a unique identifier that is associated with the second target base station, receive the unique identifier associated with the second target base station, and when the received unique identifier does not correspond to a unique identifier in the flagged entry associated with the non-unique identifier, update the neighbor list with the received unique identifier.

Figure 1:
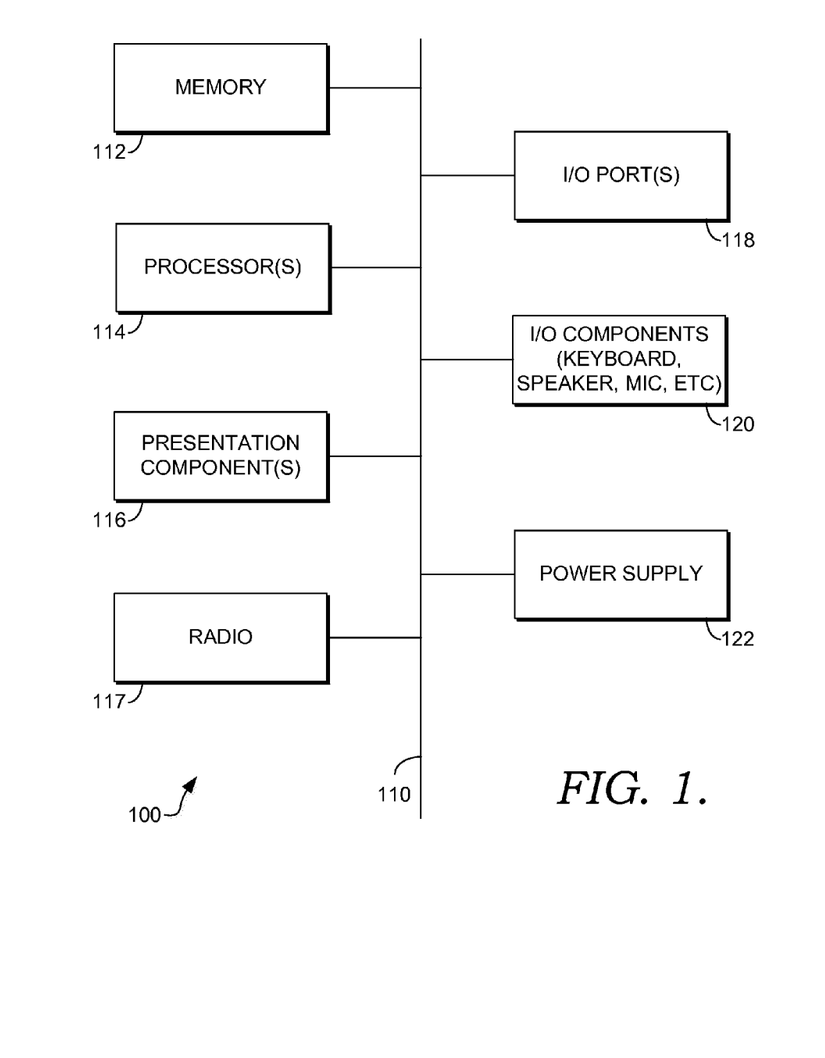
FIG. 1 depicts a block diagram of a mobile computing device ("mobile device") suitable for use in accordance with an embodiment of the present invention.

Turning now to FIG. 1, a block diagram of an illustrative mobile computing device ("mobile device") is provided and referenced generally by the numeral 100. Although some components are shown in the singular, they may be plural. For example, mobile device 100 might include multiple processors or multiple radios, etc. As illustratively shown, mobile device 100 includes a bus 110 that directly or indirectly couples various components together including memory 112, a processor 114, a presentation component 116, a radio 117, input/output ports 118, input/output components 120, and a power supply 122.

Memory 112 might take the form of one or more of the aforementioned media. Thus, we will not elaborate more here, only to say that memory component 112 can include any type of medium that is capable of storing information in a manner readable by a computing device. Processor 114 might actually be multiple processors that receive instructions and process them accordingly. Presentation component 116 includes the likes of a display, a speaker, as well as other components that can present information (such as a lamp (LED), or even lighted keyboards).

Radio 117 represents a radio that facilitates communication with a wireless telecommunications network. Illustrative wireless telecommunications technologies include LTE, CDMA, GPRS, TDMA, GSM, and the like. In some embodiments, radio 117 might also facilitate other types of wireless communications including Wi-Fi communications and GIS communications.

Input/output port 118 might take on a variety of forms. Illustrative input/output ports include a USB jack, stereo jack, infrared port, proprietary communications ports, and the like. Input/output components 120 include items such as keyboards, microphones, touch screens, and any other item usable to directly or indirectly input data into mobile device 110. Power supply 122 includes items such as batteries, fuel cells, or any other component that can act as a power source to power mobile device 110.

Figure 2:
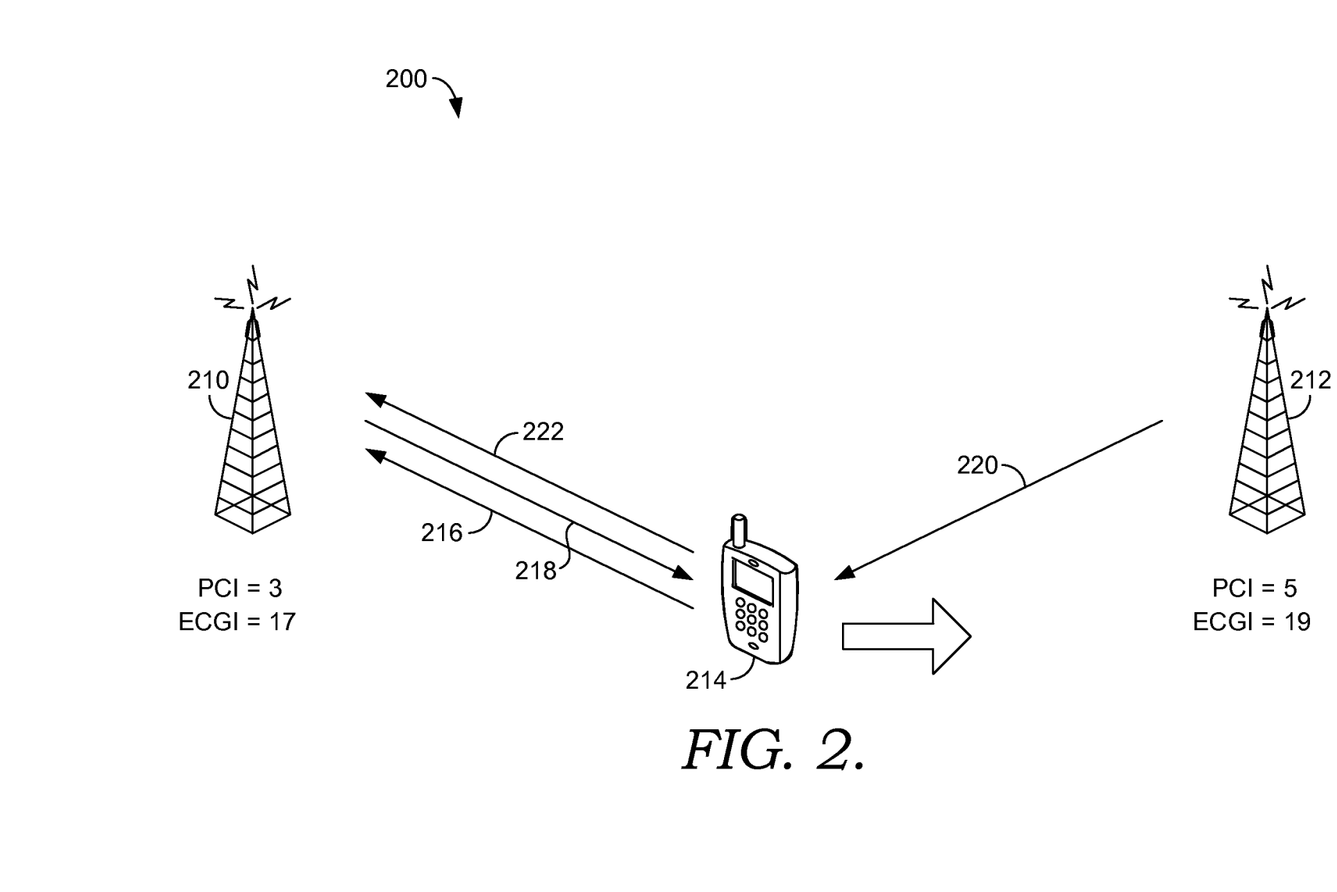
FIG. 2 depicts an operating environment suitable for use in accordance with an embodiment of the present invention.

Referring now to FIG. 2, an operating environment is depicted that is suitable for use in accordance with an embodiment of the present invention, and is generally referred to as operating environment 200. Environment 200 is utilized herein to illustrate the process of ANR. Operating environment 200 is but one example of a suitable operating environment and is not intended to suggest any limitation as to the scope of use or functionality of the invention. Neither should the operating environment 200 be interpreted as having any dependency or requirement relating to any one or combination of components illustrated.

Operating environment 200 as depicted includes a base station 210, a base station 212, and a mobile device 214. Base station 210 has a non-unique identifier equal to 3 and a unique identifier equal to 17. Base station 212 has a non-unique identifier equal to 5 and a unique identifier equal to 19. The values of 3, 5, 17, and 19 may or may not be representative of real world values for the non-unique and unique identifiers, and are intended only as illustrative examples.

In one embodiment, operating environment 200 is an LTE environment, base stations 210 and 212 are eNBs, the non-unique and unique identifiers are PCI and ECGI, respectively, and mobile device 214 is an LTE terminal. However, embodiments of the present invention are not limited to use with an LTE environment. Other types of environments having similar functionality are also suitable for use in accordance with some embodiments. Mobile device 214 may be any of a number of types of mobile devices, including mobile phones, laptop computers, tablet devices, and so forth. Mobile device 214 may include devices such as described with regard to FIG. 1.

As depicted in FIG. 2, LTE terminal 214, which is served by eNB 210, is moving from the vicinity of eNB 210 toward the vicinity of eNB 212. As described above, terminal 214 sends a measurement report 216 to eNB 210, including eNB 212's PCI=5. When eNB 210 determines that its neighbor list does not contain an entry corresponding to a PCI=5, eNB 210 sends a request 218 to terminal 214 for eNB 212's ECGI. Terminal 214 reads (item 220) eNB 212's ECGI=19 and reports it (item 222) to eNB 210. eNB 210 then updates its neighbor list to include the PCI=5 and ECGI=19 for eNB 212. Note that, when eNB 210 serves subsequent LTE terminals, eNB 210 will use the updated neighbor list. Thus, eNB 210 will not need to request the subsequent LTE terminals to read and report eNB 212's ECGI. That is a simplified description of how ANR enables a base station to update its neighbor list.

One reason the initial measurement report sent by terminal 214 reports the non-unique PCI, instead of the unique ECGI, is that the PCI is simpler for terminal 214 to decode, and thus requires less of the terminal's resources, including battery power, than if the terminal were to decode the ECGI. In a fully deployed network, when base stations' neighbor lists are up-to-date, the PCI will generally suffice to identify a neighboring base station. In the event that a serving base station does not have a neighbor-list entry for a reported PCI, then the ANR process enables the serving base station to update its neighbor list, as described above.

Figure 3:
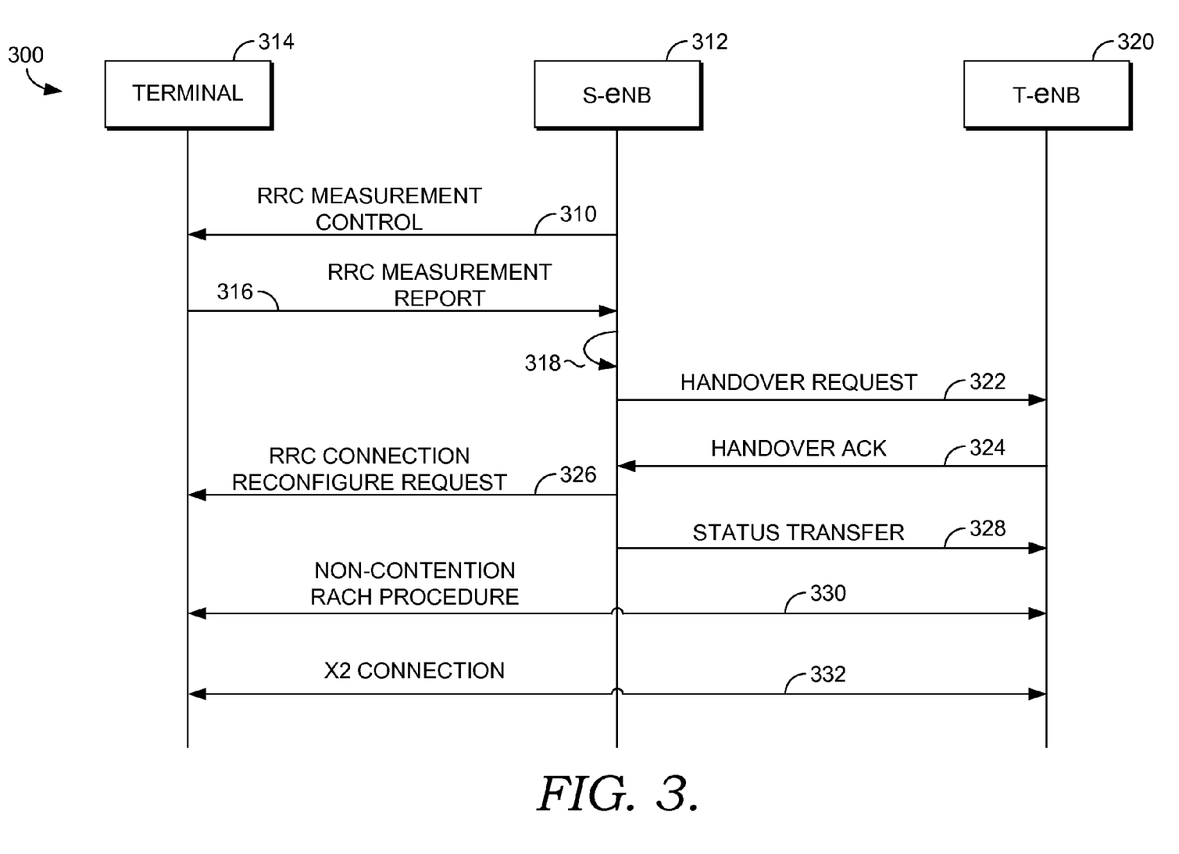
FIG. 3 depicts a diagram illustrating a simplified handover process in accordance with an embodiment of the present invention.

Referring now to FIG. 3, a diagram is depicted illustrating a simplified handover process in accordance with an embodiment of the present invention, and is generally referred to as handover process 300. Handover process 300 is but one example of a suitable handover process and is not intended to suggest any limitation as to the scope of use or functionality of the invention. Neither should handover process 300 be interpreted as having any dependency or requirement relating to any one or combination of components illustrated.

At step 310, a source base station, eNB 312, requests a measurement report from a mobile device, LTE terminal 314. At step 316, LTE terminal 314 sends the measurement report to source eNB 312. At step 318, source eNB 312 determines to hand over LTE terminal 314 to a target eNB 320, based on the received measurement report. At step 322, source eNB 312 sends a handover request to target eNB 320 and receives a handover acknowledgement at step 324. Source eNB 312 then sends a handover command to LTE terminal 314 at step 326, and sends a status transfer to target eNB 320 at step 328. At step 330, target eNB 320 initiates a non-contention Random Access Channel (RACH) procedure and an X2 connection is established between LTE terminal 314 and target eNB 320 at step 332.

As described above, a situation may arise during the popcorn stage of network deployment when a source eNB has an outdated neighbor list, and as a result, the source eNB confuses the target eNB with another eNB having the same PCI. In that event, the RACH procedure cannot be initiated, and the LTE terminal's connection is dropped, i.e., the X2 connection is not established. When the handover fails, the LTE terminal will transmit an RRC Connection Reconfiguration Failure message. This type of situation is described with regard to FIG. 4.

Figure 4:
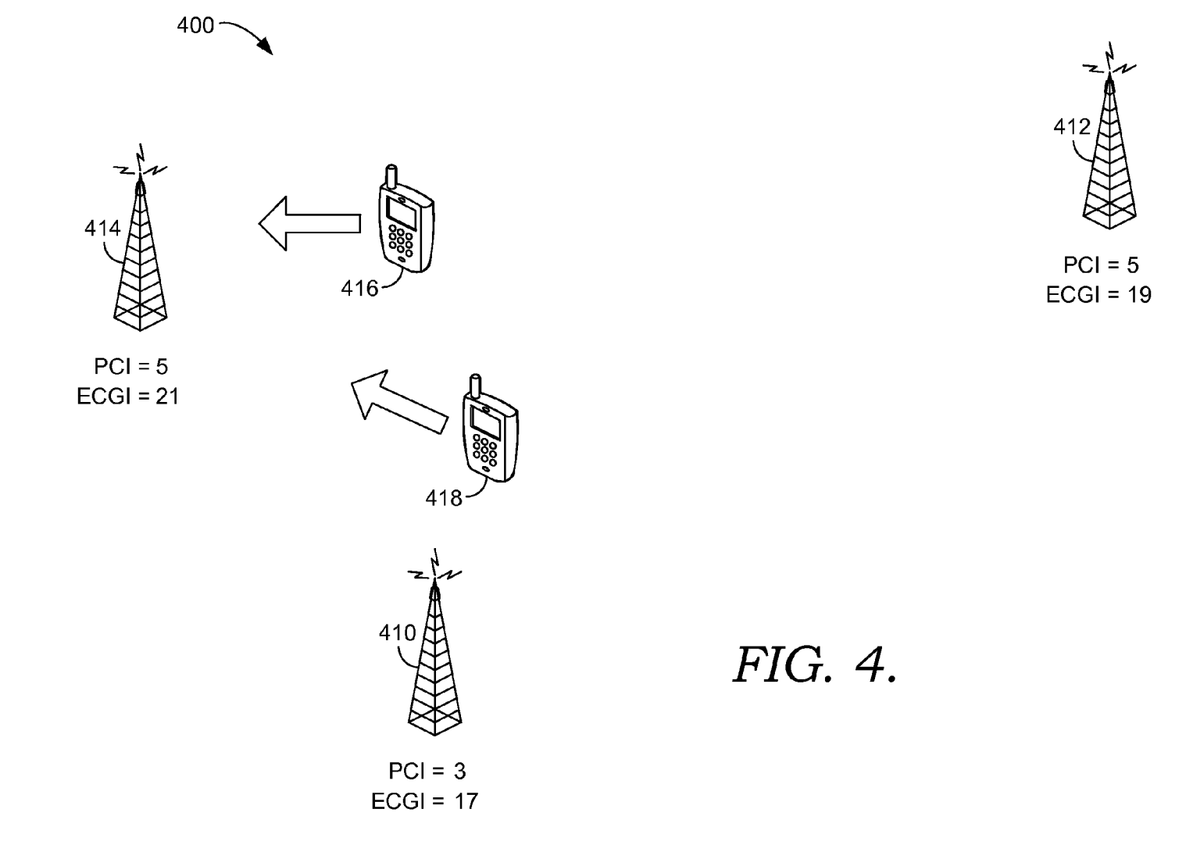
FIG. 4 depicts an operating environment suitable for use in accordance with an embodiment of the present invention.

FIG. 4 depicts an operating environment suitable for use in accordance with an embodiment of the present invention, and is generally referred to as operating environment 400. Operating environment 400 is but one example of a suitable operating environment and is not intended to suggest any limitation as to the scope of use or functionality of the invention. Neither should operating environment 400 be interpreted as having any dependency or requirement relating to any one or combination of components illustrated.

Operating environment 400 as depicted includes an eNB 410, an eNB 412, an eNB 414, an LTE terminal 416, and an LTE terminal 418. eNB 410 has a PCI=3 and an ECGI=17. eNB 412 has a PCI=5 and an ECGI=19. eNB 414 has a PCI=5 and an ECGI=21. As depicted, eNB 412 and eNB 414 have identical PCIs, but different ECGIs. The values of 3, 5, 17, 19, and 21 may or may not be representative of real world values for PCI and ECGI, and are intended only as illustrative examples.

Although operating environment 400 is described herein in terms of an LTE network as an example, embodiments of the present invention are not limited to use with an LTE network. Other types of networks having functionality similar to an LTE network are also suitable for use with some embodiments. Accordingly, eNBs 410, 412, and 414 may be referred to more generally as base stations 410, 412, and 414, and LTE terminals 416 and 418 may be more generally referred to as mobile devices 416 and 418.

In the present example, eNB 410 is the source eNB, or serving eNB, for LTE terminal 416, which is depicted as moving from the vicinity of eNB 410 toward the vicinity of nearby eNB 414. eNB 410 and the more distant eNB 412 represent base stations that were deployed early in the popcorn stage of the network rollout, prior to the deployment of eNB 414. In the present example, prior to the deployment of eNB 414, eNB 410 determined that eNB 412 was a neighboring base station, and eNB 412 was then added to eNB 410's neighbor list. eNB 414, which is nearer to eNB 410 than is eNB 412, has not yet been discovered by eNB 410.

As depicted, eNB 414 and eNB 412 share an identical PCI=5. When LTE terminal 416 sends a measurement report to eNB 410, eNB 410 determines to hand over LTE terminal 416 to the target eNB having a reported PCI=5. However, in the present example, the PCI=5 included in the measurement report corresponds to eNB 414, not the more distant eNB 412. Because eNB 410's neighbor list does not yet reflect the presence of eNB 414, eNB 410 will erroneously attempt to hand over LTE terminal 416 to eNB 412 which also has a PCI=5. The handover attempt then fails.

Subsequent to the failed handover of LTE terminal 416 from eNB 410 to eNB 412, LTE terminal 416 may reestablish a connection to the communications network through either eNB 410 or some other base station. In an embodiment, once LTE terminal 416 reestablishes the connection, the terminal sends a notification to eNB 410 indicating that the handover failed. In an embodiment, the notification includes the non-unique identifier of the target base station, i.e., the target eNB. The notification may also include the non-unique and/or unique identifiers of the source base station that initiated the handover.

LTE terminal 418, which is depicted as moving from the vicinity of eNB 410 toward the vicinity of eNB 414, is discussed below with regard to FIG. 5.

Figure 5:
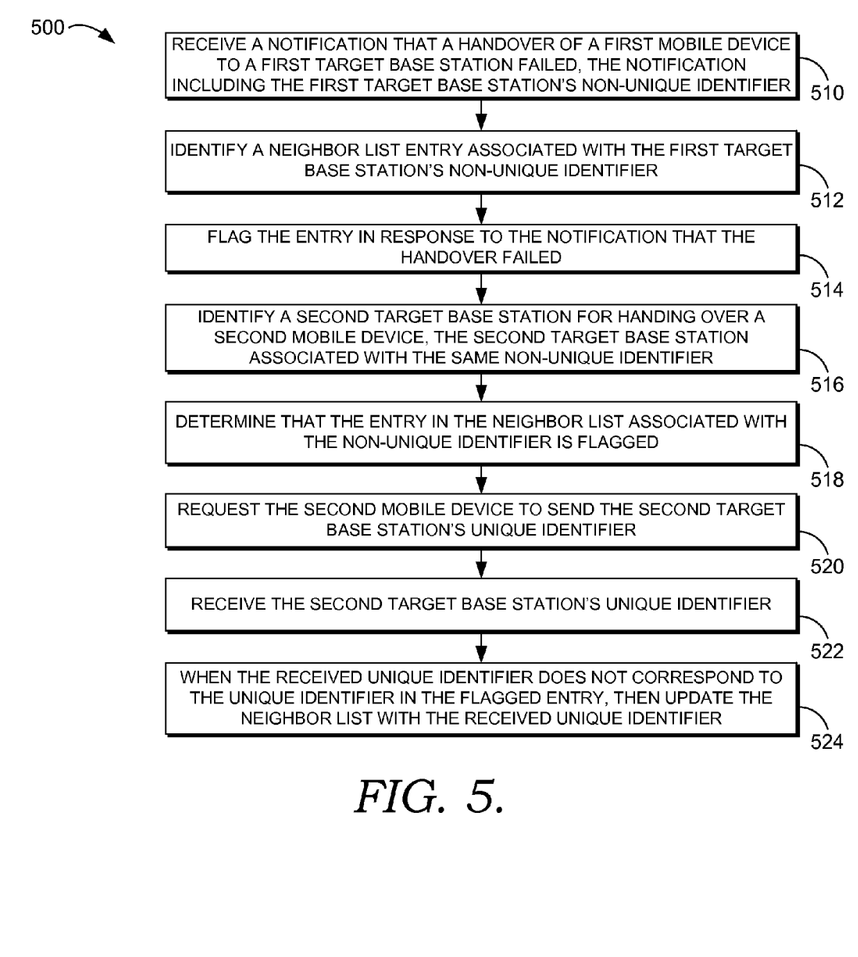
FIG. 5 depicts a flowchart illustrating a method of updating a neighbor list in accordance with an embodiment of the present invention.

With regard to FIG. 5, a flowchart is depicted illustrating a method of updating a neighbor list in accordance with an embodiment of the present invention, and is generally referred to as method 500. Method 500 is but one example of a suitable method and is not intended to suggest any limitation as to the scope of use or functionality of the invention. Neither should method 500 be interpreted as having any dependency or requirement relating to any one or combination of components illustrated.

Method 500 is described herein with reference to FIG. 4. Although method 500 is described in terms of an LTE network, embodiments of the present invention are not limited to use with an LTE network. Other types of networks having functionality similar to an LTE network are also suitable for use with some embodiments. Accordingly, the eNBs and LTE terminals described with regard to method 500 may be more generally referred to as base stations and mobile devices, respectively.

At step 510, eNB 410 receives the notification from LTE terminal 416 that the handover of LTE 416 from eNB 410 to the target eNB failed. As described above, the notification includes a non-unique identifier of the target base station, i.e., the target eNB. In an embodiment, the non-unique identifier is the target eNB's PCI (PCI=5).

At step 512, an entry in eNB 410's neighbor list is identified that is associated with the target eNB's PCI=5. The entry is flagged, in step 514, in response to the notification that the handover failed. The flag, which may take any of a number of different forms that are known in the art for marking or flagging database records, signifies for future reference that a handover to an eNB having the associated PCI failed.

At step 516, and with reference to FIG. 4, a second target eNB station is identified for handing over a second LTE terminal 418 from the source base station 410, where the second target eNB is associated with the same non-unique PCI=5 as the first target eNB. Because the second target eNB is initially identified by its non-unique PCI, eNB 410 has no way of initially knowing whether or not it is the same base station as the first target eNB. Additionally, although LTE terminals 416 and 418 are depicted in FIG. 4 as separate devices, the two may either be separate or one and the same. In an embodiment, the method for updating a neighbor list depicted in FIG. 5 and described herein neither depends upon nor requires LTE terminal 416 and LTE terminal 418 to be separate devices.

In an embodiment, the second LTE terminal 418 is moving toward eNB 414, and has reported eNB 414's PCI=5 to source eNB 410, as happened with LTE terminal 416. eNB 410's neighbor list is still outdated, and an attempt to hand over the second LTE terminal based on the outdated neighbor list would again result in a handover failure. However, at step 518, the source eNB 410 locates, within its neighbor list, the entry that corresponds to a PCI=5, and determines, at step 518, that the entry associated with PCI=5 of the second target base station is flagged, which indicates that a previous handover utilizing the same target PCI=5 failed.

At step 520, upon determining that the entry is flagged, eNB 410 requests the second LTE terminal 418 to send the second eNB's unique identifier. In an embodiment, the unique identifier is the target eNB's ECGI. In the present example, the unique identifier of the target eNB 414 is ECGI=21. At step 522, the source eNB 410 receives the target eNB 414's ECGI from the second LTE terminal 418, and determines whether eNB 414's ECGI matches the ECGI that is stored in the flagged entry that is associated with the PCI=5. Because the neighbor list is outdated, the entry associated with PCI=5 contains the ECGI of eNB 412, which is ECGI=19. At step 524, when the received ECGI does not match the ECGI in the flagged entry, the mismatch indicates the flagged entry is outdated, and the source base station 410 then updates its neighbor list to associate the eNB 414 with the correct combination of PCI and ECGI.

Many different arrangements of the various components depicted, as well as components not shown, are possible without departing from the scope of the claims below. Some embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. One or more non-transitory computer-readable media having embodied thereon computer-usable instructions that, when executed, facilitate a method for updating a neighbor list, the method comprising:

receiving a notification that a handover of a first mobile device to a first target base station failed, wherein the notification includes a non-unique identifier associated with the first target base station;

identifying an entry in the neighbor list that is associated with the non-unique identifier;

flagging the entry in response to the notification that the handover failed;

identifying a second target base station for handing over a second mobile device, wherein the second target base station is associated with the same non-unique identifier as the first target base station;

determining that the entry in the neighbor list associated with the non-unique identifier is flagged;

based on the determination that the entry in the neighbor list is flagged, requesting the second mobile device to send a unique identifier that is associated with the second target base station;

receiving the unique identifier that is associated with the second target base station; and when the received unique identifier does not correspond to a unique identifier in the flagged entry associated with the non-unique identifier, then updating the neighbor list with the received unique identifier.

2. The non-transitory media of claim 1, wherein the notification that the handover failed is received at a source base station that initiated the handover, and wherein the handover of the first mobile device is from the source base station to the first target base station.

3. The non-transitory media of claim 2, wherein the source base station receives the notification that the handover failed from the first mobile device.

4. The non-transitory media of claim 2, wherein the source base station receives the notification that the handover failed from a base station with which the mobile device re-established a network connection after the handover failed.

5. The non-transitory media of claim 2, wherein the source base station maintains the neighbor list, wherein the neighbor list includes entries for respective neighboring base stations, and wherein each entry includes a non-unique identifier and a unique identifier that are associated with the respective neighboring base station.

6. The non-transitory media of claim 5, the method further comprising verifying whether the received unique identifier corresponds to the unique identifier in the flagged entry associated with the non-unique identifier.

7. The non-transitory media of claim 1, wherein identifying the second target base station for handing over the second mobile device includes:
   transmitting a request for a measurement report to the second mobile device;
   receiving the measurement report from the second mobile device, wherein the measurement report identifies other base stations the second mobile device is receiving and respective signal strengths associated with the other base stations; and
   identifying the second target base station for handing over the second mobile device, based on the measurement report.

8. A method for updating a neighbor list, comprising:
   receiving a notification that a handover of a first mobile device to a first target base station failed, wherein the notification includes a non-unique identifier associated with the first target base station;
   identifying an entry in the neighbor list that is associated with the non-unique identifier;
   flagging the entry in response to the notification that the handover failed;
   identifying a second target base station for handing over a second mobile device, wherein the second target base station is associated with the same non-unique identifier as the first target base station;
   determining that the entry in the neighbor list associated with the non-unique identifier is flagged;
   based on the determination that the entry in the neighbor list is flagged, requesting the second mobile device to send a unique identifier that is associated with the second target base station;
   receiving the unique identifier that is associated with the second target base station; and
   when the received unique identifier does not correspond to a unique identifier in the flagged entry associated with the non-unique identifier, then updating the neighbor list with the received unique identifier.

9. The method of claim 8, wherein the notification that the handover failed is received at a source base station that initiated the handover, and wherein the handover of the first mobile device is from the source base station to the first target base station.

10. The method of claim 9, wherein the source base station receives the notification that the handover failed from the first mobile device.

11. The method of claim 9, wherein the source base station receives the notification that the handover failed from a base station with which the mobile device re-established a network connection after the handover failed.

12. The method of claim 9, wherein the source base station maintains the neighbor list, wherein the neighbor list includes entries for respective neighboring base stations, and wherein each entry includes a non-unique identifier and a unique identifier that are associated with the respective neighboring base station.

13. The method of claim 12, the method further comprising verifying whether the received unique identifier corresponds to the unique identifier in the flagged entry associated with the non-unique identifier.

14. The method of claim 8, wherein identifying the second target base station for handing over the second mobile device includes:
   transmitting a request for a measurement report to the second mobile device;
   receiving the measurement report from the second mobile device, wherein the measurement report identifies other base stations the second mobile device is receiving and respective signal strengths associated with the other base stations; and
   identifying the second target base station for handing over the second mobile device, based on the measurement report.

15. A system for updating a neighbor list, comprising:
   a first mobile device; and
   a source base station in a mobile communications network that communicates with the first mobile device, wherein the source base station is configured to
   send a message to the first mobile device identifying a first target base station for a handover of the first mobile device from the source base station to the first target base station,
   receive a notification that the handover failed, wherein the notification includes a non-unique identifier associated with the first target base station;
   identify an entry in the neighbor list that is associated with the non-unique identifier,
   flag the entry in response to the notification that the handover failed, identify a second target base station for handing over a second mobile device, wherein the second target base station is associated with the same non-unique identifier as the first target base station, determine that the entry in the neighbor list associated with the non-unique identifier is flagged;

based on the determination that the entry is flagged, request the second mobile device to send a unique identifier that is associated with the second target base station, receive the unique identifier associated with the second target base station, and when the received unique identifier does not correspond to a unique identifier in the flagged entry associated with the non-unique identifier, update the neighbor list with the received unique identifier.

16. The system of claim 15, wherein the notification that the handover failed is received from the first mobile device once a connection is reestablished between the first mobile device and the source base station subsequent to the failed handover.

17. The system of claim 15, wherein the notification that the handover failed is received from another base station that established a connection with the first mobile device subsequent to the failed handover.

18. The system of claim 15, wherein the source base station maintains the neighbor list, wherein the neighbor list includes entries for respective neighboring base stations, and wherein each entry includes a non-unique identifier and a unique identifier that are associated with the respective neighboring base station.

19. The system of claim 15, wherein the source base station is further configured to identify the second target base station based on a measurement report received from the second mobile device, wherein the measurement report identifies other base stations the second mobile device is receiving and respective signal strengths associated with the other base stations.

20. The system of claim 15, wherein the source base station is further configured to verify whether the received unique identifier corresponds to the unique identifier in the flagged entry associated with the non-unique identifier.

* * * * *